(12) United States Patent
Souchard

(10) Patent No.: US 7,548,664 B2
(45) Date of Patent: Jun. 16, 2009

(54) PRODUCING SMOOTH MOTION COMPENSATED FRAMES BY COMBINING MULTIPLE INTERPOLATION RESULTS

(75) Inventor: Christophe Souchard, Marina Del Rey, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/952,476

(22) Filed: Dec. 7, 2007

(65) Prior Publication Data

US 2008/0085056 A1  Apr. 10, 2008

Related U.S. Application Data

(63) Continuation of application No. 10/826,583, filed on Apr. 15, 2004, now Pat. No. 7,321,700.

(51) Int. Cl.
*G06K 9/32* (2006.01)

(52) U.S. Cl. ...................................... 382/300

(58) Field of Classification Search ................ 382/299, 382/300, 236, 240, 276, 293; 348/407.1, 348/412.1, 413.1, 415.1, 416.1, 459; 375/240.24, 375/240.26
See application file for complete search history.

(56) References Cited

U.S. PATENT DOCUMENTS

| | | | |
|---|---|---|---|
| 5,694,228 A | 12/1997 | Peairs et al. | |
| 5,873,830 A | 2/1999 | Hossack et al. | |
| 6,804,419 B1 | 10/2004 | Miyake | |
| 7,336,838 B2 | 2/2008 | Hur et al. | |
| 7,362,374 B2 * | 4/2008 | Holt et al. | 348/446 |
| 2004/0086193 A1 | 5/2004 | Kameyama et al. | |

* cited by examiner

*Primary Examiner*—Yon Couso
(74) *Attorney, Agent, or Firm*—Fenwick & West LLP

(57) ABSTRACT

An interpolation manager constructs multiple motion compensated interpolated frames between two existing frames, and then fuses the multiple interpolated frames into a single output frame. The interpolation manager constructs each of the multiple interpolated frames between the existing frames by selecting a pixel set from each existing frame, generating associated meshes, estimating flow motions in each direction, generating corresponding motion compensated meshes, computing warped images corresponding to each of the existing frames and combining the warped images into an interpolated frame. For each constructed interpolated frame, the interpolation manager uses different classification criteria to select the pixel sets, such that the pixel sets selected for each of the motion compensated interpolated frames vary, and hence the interpolated frames vary as well. The interpolation manager fuses the multiple interpolated frames into a single, output interpolated frame.

47 Claims, 4 Drawing Sheets

PRODUCING SMOOTH MOTION COMPENSATED FRAMES BY COMBINING MULTIPLE INTERPOLATION RESULTS

CROSS-REFERENCE TO RELATED APPLICATION

The present application is a continuation of U.S. patent application Ser. No. 10/826,583, filed on Apr. 15, 2004, entitled "Producing Smooth Motion Compensated Frames by Combining Multiple Interpolation Results", which is incorporated herein by reference.

BACKGROUND

1. Field of Invention

The present invention relates generally to video frame interpolation, and more specifically to combining results of multiple motion compensated interpolations in order to produce smooth motion in interpolated frames.

2. Background of Invention

Motion compensation frame interpolation is an important research field, with many applications such as video compression, video format conversion, special effects production, etc. Prior art frame interpolation relies on motion estimation, and therefore its performance is data dependant. Although certain methods of motion estimation work acceptably well with certain data conditions, no single prior art technique for motion estimation performs appropriately for all data types under all conditions. Different values for an interpolated frame between two existing frames can be computed, each of which may be more or less appropriate for the specific case.

What is needed are methods, systems and computer program products that generate multiple motion compensated interpolated frames, and robustly fuse the results into a single, output interpolated frame of a higher quality than could be achieved by any single technique alone.

SUMMARY OF INVENTION

An interpolation manager constructs multiple motion compensated interpolated frames between two existing frames, and then fuses the multiple motion compensated interpolated frames into a single output frame. In some embodiments, the interpolation manager constructs each of the multiple interpolated frames between the two existing frames by selecting a pixel set from each existing frame, generating associated meshes, estimating flow motions in each direction, generating corresponding motion compensated meshes, computing warped images corresponding to the existing frames and combining the warped images into an interpolated frame.

For each constructed interpolated frame, the interpolation manager uses different classification criteria to select the pixel sets, such that the pixel sets selected for each of the motion compensated interpolated frames vary, and hence the interpolated frames vary as well. The interpolation manager fuses the multiple interpolated frames into a single, output interpolated frame. The interpolation manager combines each of the pixels in the multiple interpolated frames to give a final pixel output color in the single, output interpolated frame. In some embodiments, the interpolation manager achieves this by using a voting methodology, and assuming that all votes are equally accurate.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
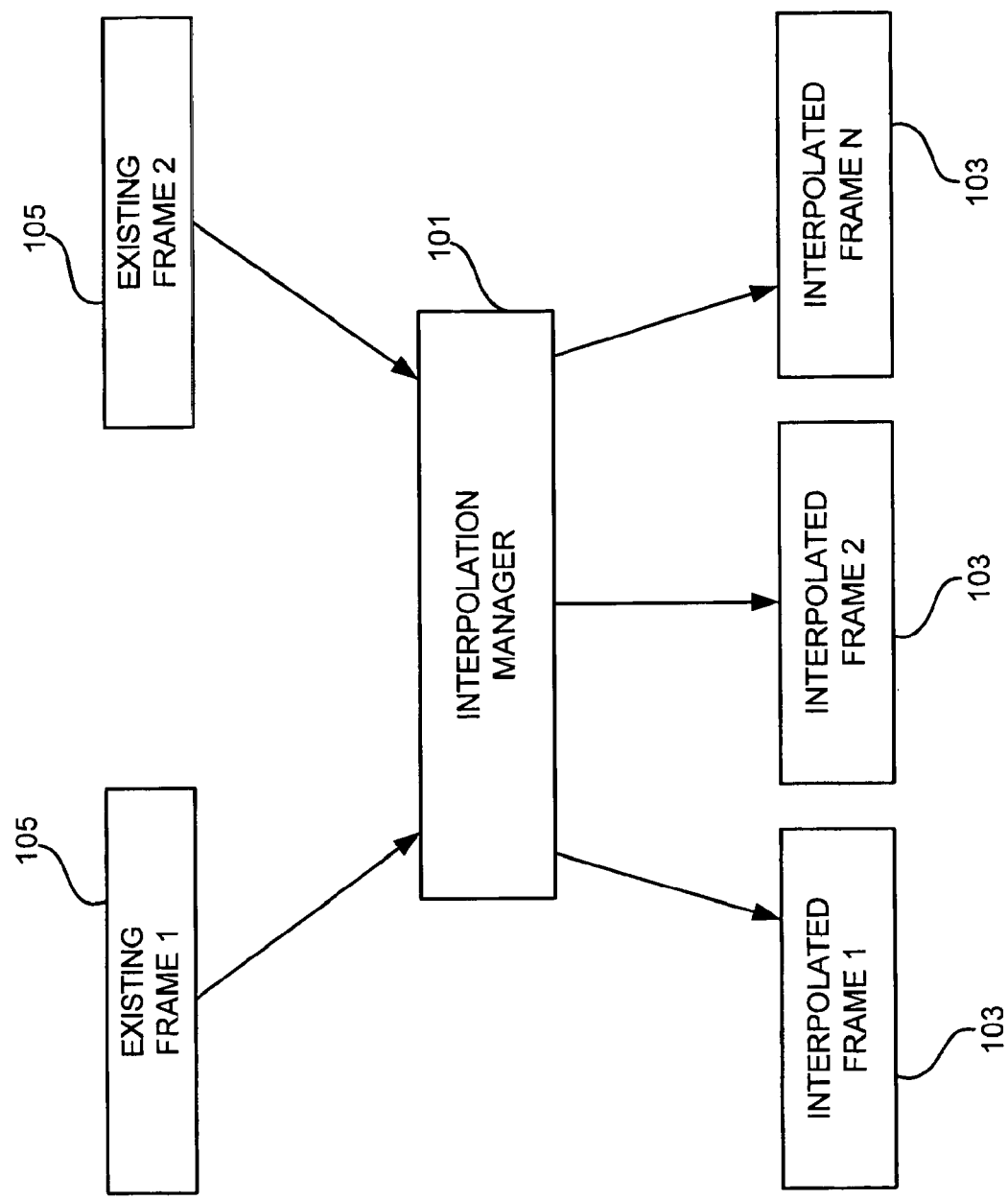
FIG. 1 is a block diagram, illustrating an interpolation manager constructing three interpolated frames between two existing frames, according to some embodiments of the present invention.

FIG. 1 illustrates a high level overview of a system for performing some embodiments of the present invention. As illustrated in FIG. 1, an interpolation manager 101 constructs multiple motion compensated interpolated frames 103 between two existing frames 105. It is to be understood that although the interpolation manager 101 is illustrated as a single entity, as the term is used herein an interpolation manager 101 refers to a collection of functionalities which can be implemented as software, hardware, firmware or any combination of the three. Where an interpolation manager 101 is implemented as software, it can be implemented as a standalone program, but can also be implemented in other ways, for example as part of a larger program, as a plurality of separate programs, or as one or more statically or dynamically linked libraries.

FIG. 1 illustrates the interpolation manager 101 constructing 3 interpolated frames 103 between existing frames 1 and 2. Of course, 3 is only an example of a number of interpolated frames 103 that the interpolation manager 101 can construct. It is to be understood that the interpolation manager 101 can construct any integer N interpolated frames 103, wherein N is greater than 1. The specific number of interpolated frames 103 to construct in a given embodiment is a design parameter.

As explained in detail below, the interpolation manager 101 builds each interpolated frame 103 such that the multiple interpolated frames 103 vary in their internal motion compensation between the two existing frames 105. This variance is used to robustly fuse the multiple motion compensated interpolated frames 103 into a single, output interpolated frame 301, as explained in detail below.

Figure 2:
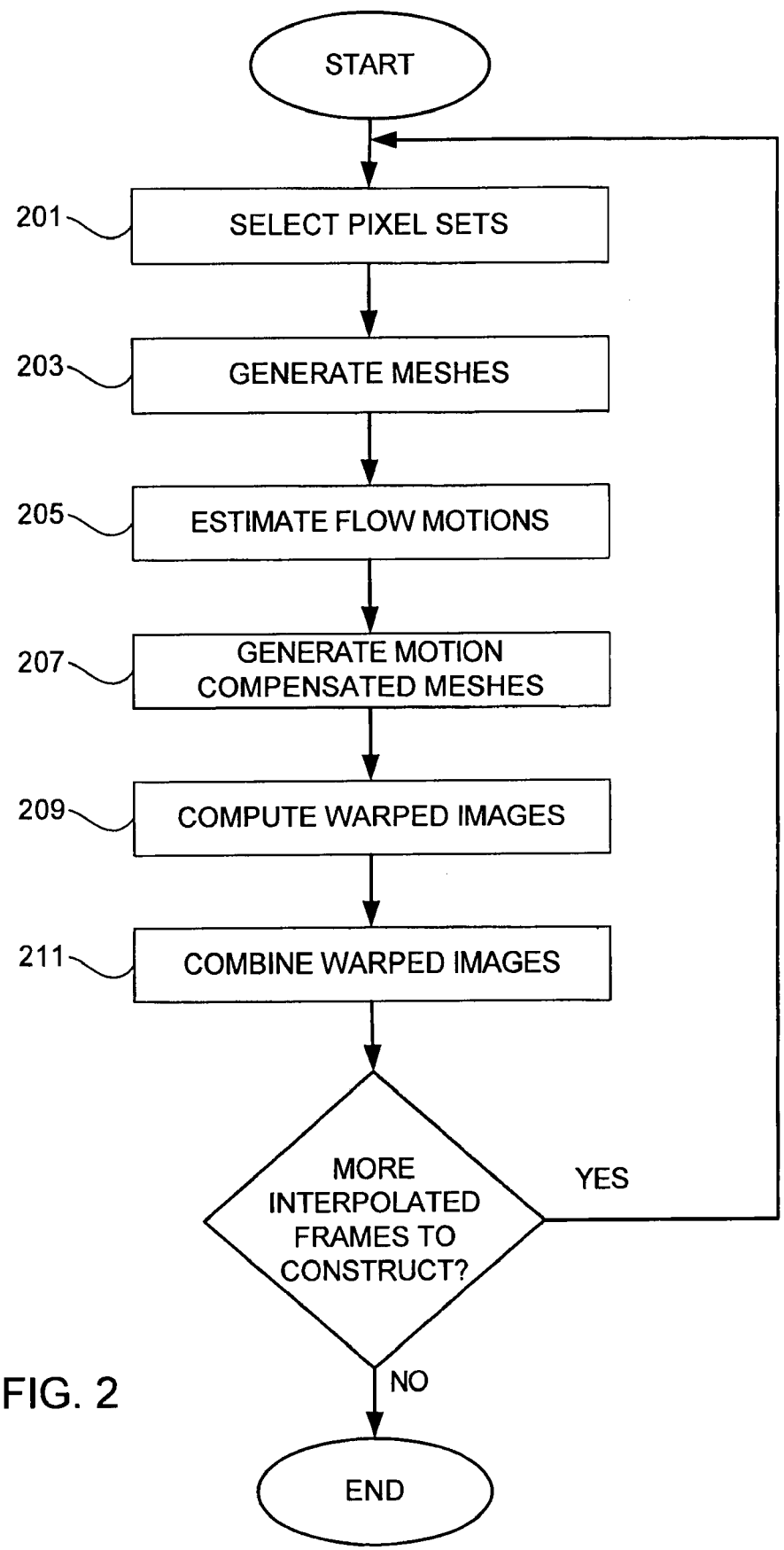
FIG. 2 is a flowchart, illustrating steps for an interpolation manager to construct interpolated frames, according to some embodiments of the present invention.

FIG. 2 illustrates steps for the interpolation manager 101 to construct the multiple interpolated frames 103, according to some embodiments of the present invention. For each interpolated frame 103 to build, the interpolation manager 101 selects 201 a first set of pixels in the first existing frame 105, and a corresponding second set of pixels in the second existing frame 105.

In some embodiments, each pixel set is selected 201 by classifying some pixels in the corresponding existing frame 105 as having a high spatial frequency contents, and selecting the classified pixels. Because not all parts of an image contain complete motion information, it is beneficial to select only those pixels in the existing frames 105 with high spatial frequency contents. This criterion can be defined so that the motion estimation step described below is well-suited to apply to the selected pixels. In such embodiments, the specific classification criteria used is different for each of the N motion compensated interpolated frames 103, such that the pixel sets selected for each of the N motion compensated frames vary.

Next, the interpolation manager generates 203 a first mesh for the first set of pixels and a second mesh for the second set of pixels. In one embodiment, this involves the interpolation manager 101 fitting a polygonal mesh to each set of pixels. This can be achieved, for example, by using a constrained Delaunay triangulation over each set of selected pixels, using the edges present in the associated existing frame 105 as imposed boundaries (i.e., the interpolation manager forces the triangulation to conform to those fixed edges).

After generating 203 the meshes, the interpolation manager 101 estimates 205 a first flow of motion from the first set of pixels to the second set of pixels, and a second flow of motion from the second set of pixels to the first set of pixels. In one embodiment, the interpolation manager 101 estimates 205 these flows of motion by using the classical optical flow constraint equation: Ix*u+Iy*v+It=0, where (u, v) are the unknown components of the flow and x, y and t stand for differentiation.

In some embodiments, during motion estimation the interpolation manager 101 exploits information from a small neighborhood around an examined pixel, by collecting constraints of neighboring points and solving the resulting overconstrained set of linear equations. Because the set of pixels selected 201 for motion estimation is optimized, the invention can avoid the known ill-conditioning drawback of classical local motion estimation techniques.

The interpolation manager 101 then generates 207 a first motion compensated mesh corresponding to the first existing frame 105, and a second motion compensated mesh corresponding to the first existing frame 105. To generate a motion compensated mesh corresponding to an existing frame 105, the interpolation manager 101 uses the corresponding polygonal mesh and the corresponding motion estimation described above. Let P1 denote a point in a polygonal mesh associated with a source existing frame 105, and P' 1 its correspondence in the destination existing frame 105 obtained during the motion estimation step. For each point P1 in the polygonal mesh, the interpolation manager 101 computes a corresponding point P in the new mesh by moving the point P1 to a new position P, which can be calculated as P=(1.0−t)*P1+t*P'1.

The interpolation manager 101 computes 209 two warped images, each corresponding to one of the existing frames 105. The interpolation manager 101 computes 209 a warped image for an existing frame by warping the frame using the corresponding polygonal and motion compensated meshes. The interpolation manager 101 then combines 211 the two warped images (W1, W2) by linearly mixing them to produce a single interpolated frame 103 Mi. For example, the linear mixing of the warped images can take the form: Mi=(1.0−t)*W1+t*W2.

The interpolation manager 101 repeats steps 201-209 N times, using N different pixel classification criteria, thereby producing N different interpolated frames 103.

Figure 3:
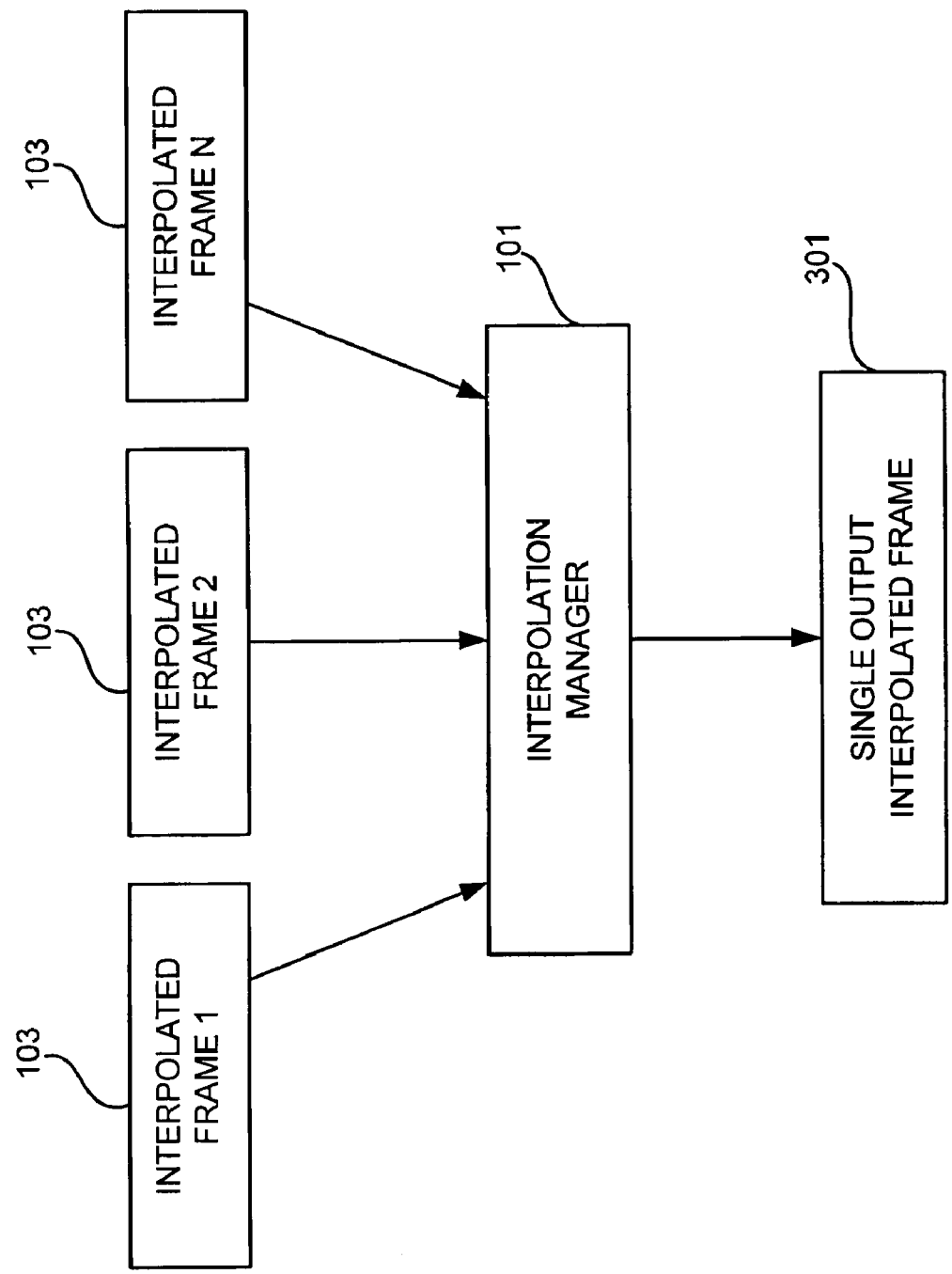
FIG. 3 is a block diagram, illustrating an interpolation manager fusing three interpolated frames into a single, output interpolated frame, according to some embodiments of the present invention.
Figure 4:
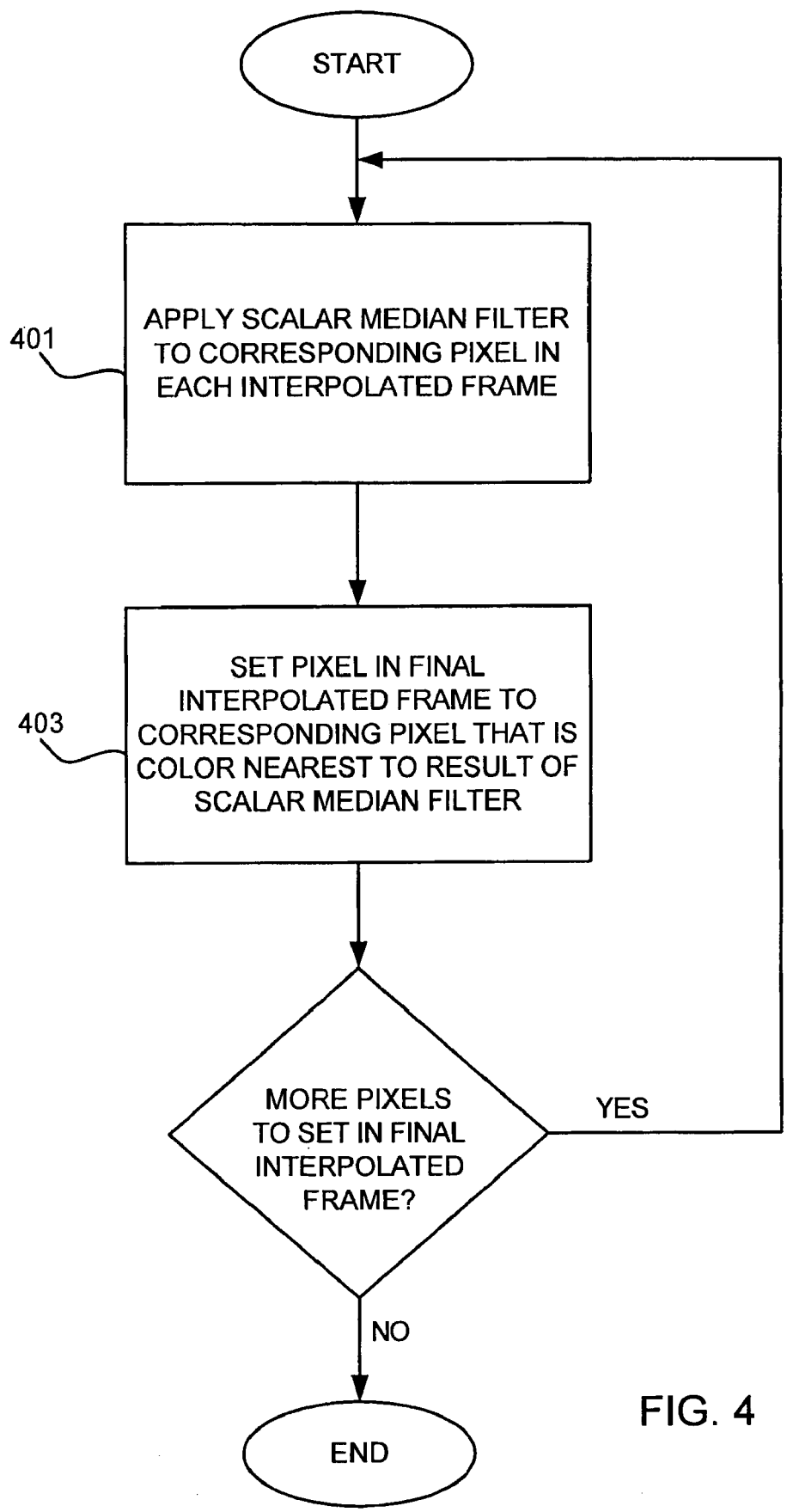
FIG. 4 is a flowchart, illustrating steps for an interpolation manager to fuse multiple interpolated frames into a single, output interpolated frame, according to some embodiments of the present invention.

FIG. 3 illustrates the interpolation manager 101 fusing 3 interpolated frames 103 into a single, output interpolated frame 301 between the two existing frames 105 (not illustrated in FIG. 3). In this process, each of the pixels in the multiple interpolated frames 103 are combined together to give a final pixel output color in O, the single, output interpolated frame 301. In some embodiments, the interpolation manager 101 achieves this by using a voting methodology, and assuming that all votes are equally accurate. For example, turning to FIG. 4, for each given pixel P(x,y) in O, the interpolation manager 101 can apply 401 a scalar median filter componentwise to the corresponding pixels Pi(x,y) in each interpolated frame 103, thus producing a pixel Pm(x,y). The interpolation manager 101 then sets 403 pixel P(x,y) in O to the pixel Pi(x,y) that is color nearest (in the sense of L1 norm) to Pm(x,y). The interpolation manager 101 can employ these steps to determine every pixel in the single, output interpolated frame 301. This solution is the output color of P(x,y).

Using this new fusion strategy to combine the results of different motion compensated interpolated frames 103 generates results of a higher quality for the given problem than could be achieved by any single technique alone. The use of this new fusion strategy produces smooth motion compensated interpolation, particularly robust to the presence of occlusion.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for producing a video frame, comprising:
   using a processor to perform the following steps:
      constructing N interpolated frames between two existing frames F1 and F2, wherein N comprises an integer with a value of at least 2, and wherein each of the N interpolated frames was generated according to a different interpolation algorithm; and
      generating a final interpolated frame by, for each pixel (x, y) in the final interpolated frame:
         determining one corresponding pixel from each of the N interpolated frames, for a total of N corresponding pixels;

determining, based on the N corresponding pixels, a color; and setting the pixel (x, y) to the determined color.

2. The method of claim 1, wherein the N interpolated frames comprise N motion compensated interpolated frames.

3. The method of claim 2, wherein constructing each of the N motion compensated interpolated frames between the two existing frames F1 and F2 comprises:

selecting a first set of pixels in F1, wherein the pixel sets selected for each of the N motion compensated frames varies;

selecting a corresponding second set of pixels in F2, wherein the corresponding pixel sets selected for each of the N motion compensated frames varies;

generating a first mesh for the first set of pixels and a second mesh for the second set of pixels;

estimating a first flow of motion from the first set of pixels to the second set of pixels, and a second flow of motion from the second set of pixels to the first set of pixels;

generating a first motion compensated mesh based on the first mesh and the first estimated flow of motion, and a second motion compensated mesh based on the second mesh and the second estimated flow of motion;

computing a first warped image by warping F1 using the first mesh and the first motion compensated mesh, and a second warped image by warping F2 using the second mesh and the second motion compensated mesh; and linearly combining the first warped image and the second warped image.

4. The method of claim 3, wherein selecting a set of pixels in a frame comprises:

classifying some pixels in the frame as having high spatial frequency contents; and selecting the classified pixels, wherein the specific classification criteria is different for each of the N motion compensated frames.

5. The method of claim 3, wherein generating a mesh for a set of pixels comprises fitting a polygonal mesh to the set of pixels.

6. The method of claim 5, wherein fitting the polygonal mesh to the set of pixels comprises applying a Delaunay triangulation to the set of pixels, using edges of the associated frame as imposed boundaries.

7. The method of claim 3, wherein estimating a flow of motion between two sets of pixels comprises applying an optical flow constraint equation to the first set of pixels, the optical flow constraint equation comprising $x*u+y*v+t=0$, wherein u and v are unknown components of the flow and x, y and t stand for differentiation.

8. A method for producing a video frame, comprising:

using a processor to perform the following steps:

constructing N interpolated frames between two existing frames F1 and F2, wherein N comprises an integer with a value of at least 2; and generating a final interpolated frame by, for each pixel (x, y) in the final interpolated frame:

determining one corresponding pixel from each of the N interpolated frames, for a total of N corresponding pixels;

determining a pixel (x', y') by combining the N corresponding pixels;

determining a color of the pixel (x', y'); and setting the pixel (x, y) to the determined color.

9. The method of claim 8, wherein combining the N corresponding pixels comprises combining the N corresponding pixels according to a voting methodology.

10. The method of claim 8, wherein combining the N corresponding pixels comprises combining the N corresponding pixels according to a voting methodology where each pixel of the N corresponding pixels is given an equal number of votes.

11. The method of claim 8, wherein combining the N corresponding pixels comprises applying a median filter componentwise to the N corresponding pixels.

12. The method of claim 8, wherein combining the N corresponding pixels comprises applying a scalar median filter componentwise to the N corresponding pixels.

13. The method of claim 8, further comprising outputting the color of the pixel (x', y').

14. The method of claim 8, further comprising:

selecting one pixel of the N corresponding pixels; and outputting a color of the selected pixel.

15. The method of claim 14, wherein the selected pixel is color nearest the color of the pixel (x', y').

16. A computer readable medium encoded with a computer program product for producing a video frame, the computer program product comprising:

program code for constructing N interpolated frames between two existing frames F1 and F2, wherein N comprises an integer with a value of at least 2, and wherein each of the N interpolated frames was generated according to a different interpolation algorithm; and program code for generating a final interpolated frame by, for each pixel (x, y) in the final interpolated frame:

determining one corresponding pixel from each of the N interpolated frames, for a total of N corresponding pixels;

determining, based on the N corresponding pixels, a color; and setting the pixel (x, y) to the determined color.

17. The computer readable medium of claim 16, wherein the N interpolated frames comprise N motion compensated interpolated frames.

18. The computer readable medium of claim 17, wherein constructing each of the N motion compensated interpolated frames between the two existing frames F1 and F2 comprises:

selecting a first set of pixels in F1, wherein the pixel sets selected for each of the N motion compensated frames varies;

selecting a corresponding second set of pixels in F2, wherein the corresponding pixel sets selected for each of the N motion compensated frames varies;

generating a first mesh for the first set of pixels and a second mesh for the second set of pixels;

estimating a first flow of motion from the first set of pixels to the second set of pixels, and a second flow of motion from the second set of pixels to the first set of pixels;

generating a first motion compensated mesh based on the first mesh and the first estimated flow of motion, and a second motion compensated mesh based on the second mesh and the second estimated flow of motion;

computing a first warped image by warping F1 using the first mesh and the first motion compensated mesh, and a second warped image by warping F2 using the second mesh and the second motion compensated mesh; and linearly combining the first warped image and the second warped image.

19. The computer readable medium of claim 18, wherein selecting a set of pixels in a frame comprises:

classifying some pixels in the frame as having high spatial frequency contents; and selecting the classified pixels, wherein the specific classification criteria is different for each of the N motion compensated frames.

20. The computer readable medium of claim 18, wherein generating a mesh for a set of pixels comprises fitting a polygonal mesh to the set of pixels.

21. The computer readable medium of claim 20, wherein fitting the polygonal mesh to the set of pixels comprises applying a Delaunay triangulation to the set of pixels, using edges of the associated frame as imposed boundaries.

22. The computer readable medium of claim 18, wherein estimating a flow of motion between two sets of pixels comprises applying an optical flow constraint equation to the first set of pixels, the optical flow constraint equation comprising $x*u+y*v+t=0$, wherein u and v are unknown components of the flow and x, y and t stand for differentiation.

23. A computer readable medium encoded with a computer program product for producing a video frame, the computer program product comprising:
 program code for constructing N interpolated frames between two existing frames F1 and F2, wherein N comprises an integer with a value of at least 2; and
 program code for generating a final interpolated frame by, for each pixel (x, y) in the final interpolated frame:
  determining one corresponding pixel from each of the N interpolated frames, for a total of N corresponding pixels;
  determining a pixel (x', y') by combining the N corresponding pixels;
  determining a color of the pixel (x', y'); and
  setting the pixel (x, y) to the determined color.

24. The computer readable medium of claim 23, wherein combining the N corresponding pixels comprises combining the N corresponding pixels according to a voting methodology.

25. The computer readable medium of claim 23, wherein combining the N corresponding pixels comprises combining the N corresponding pixels according to a voting methodology where each pixel of the N corresponding pixels is given an equal number of votes.

26. The computer readable medium of claim 23, wherein combining the N corresponding pixels comprises applying a median filter componentwise to the N corresponding pixels.

27. The computer readable medium of claim 23, wherein combining the N corresponding pixels comprises applying a scalar median filter componentwise to the N corresponding pixels.

28. The computer readable medium of claim 23, farther comprising program code for outputting the color of the pixel (x', y').

29. The computer readable medium of claim 23, further comprising:
 program code for selecting one pixel of the N corresponding pixels; and
 program code for outputting a color of the selected pixel.

30. The computer readable medium of claim 29, wherein the selected pixel is color nearest the color of the pixel (x', y').

31. A computer system for producing a video frame, the computer system comprising:
 a processor configured to execute a method, the method comprising:
  constructing N interpolated frames between two existing frames F1 and F2, wherein N comprises an integer with a value of at least 2, and wherein each of the N interpolated frames was generated according to a different interpolation algorithm; and
  generating a final interpolated frame by, for each pixel (x, y) in the final interpolated frame:
   determining one corresponding pixel from each of the N interpolated frames, for a total of N corresponding pixels;
   determining, based on the N corresponding pixels, a color; and
   setting the pixel (x, y) to the determined color.

32. The computer system of claim 31, wherein the N interpolated frames comprise N motion compensated interpolated frames.

33. The computer system of claim 32, wherein constructing each of the N motion compensated interpolated frames between the two existing frames F1 and F2 comprises:
 selecting a first set of pixels in F1, wherein the pixel sets selected for each of the N motion compensated frames varies;
 selecting a corresponding second set of pixels in F2, wherein the corresponding pixel sets selected for each of the N motion compensated frames varies;
 generating a first mesh for the first set of pixels and a second mesh for the second set of pixels;
 estimating a first flow of motion from the first set of pixels to the second set of pixels, and a second flow of motion from the second set of pixels to the first set of pixels;
 generating a first motion compensated mesh based on the first mesh and the first estimated flow of motion, and a second motion compensated mesh based on the second mesh and the second estimated flow of motion;
 computing a first warped image by warping F1 using the first mesh and the first motion compensated mesh, and a second warped image by warping F2 using the second mesh and the second motion compensated mesh; and
 linearly combining the first warped image and the second warped image.

34. The computer system of claim 33, wherein selecting a set of pixels in a frame comprises:
 classifying some pixels in the frame as having high spatial frequency contents; and
 selecting the classified pixels, wherein the specific classification criteria is different for each of the N motion compensated frames.

35. The computer system of claim 33, wherein generating a mesh for a set of pixels comprises fitting a polygonal mesh to the set of pixels.

36. The computer system of claim 35, wherein fitting the polygonal mesh to the set of pixels comprises applying a Delaunay triangulation to the set of pixels, using edges of the associated frame as imposed boundaries.

37. The computer system of claim 33, wherein estimating a flow of motion between two sets of pixels comprises applying an optical flow constraint equation to the first set of pixels, the optical flow constraint equation comprising $x*u+y*v+t=0$, wherein u and v are unknown components of the flow and x, y and t stand for differentiation.

38. A computer system for producing a video frame, the computer system comprising:
 a processor configured to execute a method, the method comprising:
  constructing N interpolated frames between two existing frames F1 and F2, wherein N comprises an integer with a value of at least 2; and
  generating a final interpolated frame by, for each pixel (x, y) in the final interpolated frame:
   determining one corresponding pixel from each of the N interpolated frames, for a total of N corresponding pixels;

determining a pixel (x', y') by combining the N corresponding pixels;
determining a color of the pixel (x', y'); and
setting the pixel (x, y) to the determined color.

39. The computer system of claim 38, wherein combining the N corresponding pixels comprises combining the N corresponding pixels according to a voting methodology.

40. The computer system of claim 38, wherein combining the N corresponding pixels comprises combining the N corresponding pixels according to a voting methodology where each pixel of the N corresponding pixels is given an equal number of votes.

41. The computer system of claim 38, wherein combining the N corresponding pixels comprises applying a median filter componentwise to the N corresponding pixels.

42. The computer system of claim 38, wherein combining the N corresponding pixels comprises applying a scalar median filter componentwise to the N corresponding pixels.

43. The computer system of claim 38, wherein the method further comprises outputting the color of the pixel (x', y').

44. The computer system of claim 38, wherein the method further comprises:
selecting one pixel of the N corresponding pixels; and
outputting a color of the selected pixel.

45. The computer system of claim 44, wherein the selected pixel is color nearest the color of the pixel (x', y').

46. A computer system for producing a video frame, comprising:
hardware means for constructing N interpolated frames between two existing frames F1 and F2, wherein N comprises an integer with a value of at least 2, and wherein each of the N interpolated frames was generated according to a different interpolation algorithm; and
hardware means for generating a final interpolated frame by, for each pixel (x, y) in the final interpolated frame:
determining one corresponding pixel from each of the N interpolated frames, for a total of N corresponding pixels;
determining, based on the N corresponding pixels, a color; and setting the pixel (x, y) to the determined color.

47. A computer system for producing a video frame, comprising:
hardware means for constructing N interpolated frames between two existing frames F1 and F2, wherein N comprises an integer with a value of at least 2; and
hardware means for generating a final interpolated frame by, for each pixel (x, y) in the final interpolated frame:
determining one corresponding pixel from each of the N interpolated frames, for a total of N corresponding pixels;
determining a pixel (x', y') by combining the N corresponding pixels;
determining a color of the pixel (x', y'); and
setting the pixel (x, y) to the determined color.

* * * * *